(12) United States Patent
Huang et al.

(10) Patent No.: US 11,009,674 B2
(45) Date of Patent: May 18, 2021

(54) DRIVING MECHANISM

(71) Applicant: TDK TAIWAN CORP., Taoyuan (TW)

(72) Inventors: Chien-Lun Huang, Taoyuan (TW); Shou-Jen Liu, Taoyuan (TW); Chia-Pin Hsu, Taoyuan (TW); Sin-Jhong Song, Taoyuan (TW)

(73) Assignee: TDK Taiwan Corp., Taoyuan (TW)

( * ) Notice: Subject to any disclaimer, the term of this patent is extended or adjusted under 35 U.S.C. 154(b) by 153 days.

(21) Appl. No.: 16/028,544

(22) Filed: Jul. 6, 2018

(65) Prior Publication Data

US 2019/0011665 A1 Jan. 10, 2019

Related U.S. Application Data

(60) Provisional application No. 62/529,806, filed on Jul. 7, 2017.

(30) Foreign Application Priority Data

Jun. 27, 2018 (CN) .......................... 201810681945.2

(51) Int. Cl.
*G02B 7/09* (2021.01)
*G03B 3/10* (2021.01)
*G03B 13/36* (2021.01)

(52) U.S. Cl.
CPC ................ *G02B 7/09* (2013.01); *G03B 3/10* (2013.01); *G03B 13/36* (2013.01); *G03B 2205/0069* (2013.01)

(58) Field of Classification Search
CPC ..... G02B 7/09; G02B 13/009; H02K 41/0356
USPC ................................................ 359/820, 824
See application file for complete search history.

(56) References Cited

U.S. PATENT DOCUMENTS

2016/0154204 A1* 6/2016 Lim ..................... G02B 27/646
359/557

\* cited by examiner

*Primary Examiner* — James R Greece
(74) *Attorney, Agent, or Firm* — Muncy, Geissler, Olds & Lowe, P.C.

(57) ABSTRACT

A driving mechanism for driving an optical element is provided, including a housing, a holder movably disposed in the housing for receiving the optical element, a driving assembly, and a base. The housing has plastic material and a first joining structure. The driving assembly is disposed in the housing for driving the holder and the optical element to move relative to the housing. The base has a second joining structure. The first and second joining structures extend along the optical axis of the optical element, wherein the second joining structure forms a connection surface facing the optical axis and connected to the first joining structure.

21 Claims, 19 Drawing Sheets

DRIVING MECHANISM

CROSS REFERENCE TO RELATED APPLICATIONS

This Application claims priority claims priority of provisional U.S. Patent Application Ser. No. 62/529,806, filed on Jul. 7, 2017 and China Patent Application No. 201810681945.2 filed on Jun. 27, 2018, the entirety of which is incorporated by reference herein.

BACKGROUND OF THE INVENTION

Field of the Invention

The application relates in general to a driving mechanism, and in particular, to a driving mechanism having a plastic housing for moving an optical element.

Description of the Related Art

As technology has advanced, a lot of electronic devices (for example, cameras and smartphones) have incorporated the functionality of taking photographs and recording video. These electronic devices have become more commonplace, and have been developed to be more convenient and thin.

In some electronic devices, several coils and magnets corresponding thereto are usually applied in a lens driving mechanism for adjusting the focus of a lens. However, miniaturization of the electronic devices may cause inadequate mechanical strength and high assembly difficulty of the lens driving mechanism. Thus, how to address the aforementioned problems has become a challenge.

BRIEF SUMMARY OF INVENTION

In view of the aforementioned problems, the object of the invention is to provide a driving mechanism for driving an optical element. The driving mechanism includes a housing, a holder movably disposed in the housing for receiving the optical element, a driving assembly, and a base. The housing has plastic material and a first joining structure. The driving assembly is disposed in the housing for driving the holder and the optical element to move relative to the housing. The base has a second joining structure. The first and second joining structures extend along an optical axis of the optical element, wherein the second joining structure forms a connection surface facing the optical axis and connected to the first joining structure.

In some embodiments, the base further has a plastic main body and a metal member, and the second joining structure comprises a through hole formed on the metal member, wherein the first joining structure is extended through the through hole.

In some embodiments, the second joining structure is exposed to a bottom side of the base.

In some embodiments, the first joining structure protrudes from a lower surface of the metal member.

In some embodiments, an end surface of the first joining structure has a height along the optical axis and between the metal member and a bottom surface of the main body.

In some embodiments, the first joining structure forms a T-shaped end portion.

In some embodiments, the housing further has two first joining structures, and the base further has a plastic main body, two metal members embedded in the main body, and two second joining structures, wherein the second joining structures are respectively formed on the metal members, corresponding to the first joining structures.

In some embodiments, the first joining structure forms a cavity, and the second joining structure forms a protrusion joined in the recess.

In some embodiments, the housing is rectangular and has four first joining structures located at four corners of the housing, and the base has four second joining structures corresponding to the first joining structures.

In some embodiments, the housing further has a thickened portion with the first joining structure formed thereon.

In some embodiments, the housing further has a stopper, and the holder comprises plastic material, wherein the stopper contacts the holder to restrict the holder and the optical element in a limit position.

In some embodiments, the housing further has a channel formed on an inner surface of the housing and adjacent to the base.

In some embodiments, the channel is located at the edge of the inner surface.

In some embodiments, the base further has a wall and a protrusion protruding from an outer surface of the wall, and the protrusion abuts an inner surface of the housing.

In some embodiments, the housing further has a recess, and the base further has an opening portion and a rib, wherein the opening portion is located adjacent to the recess, and the rib is extended from the opening portion along an inward direction of the opening portion, wherein the inward direction is not parallel to the optical axis.

In some embodiments, the housing further has a recess, and the base further has an opening portion and a rib portion, wherein the opening portion is located adjacent to the recess, and the rib portion is extended along an outward direction of the base, wherein the outward direction is not parallel to the optical axis.

In some embodiments, the base further has a plastic main body and a metal member, the opening portion is formed on the main body, and the rib portion is formed on the metal member.

In some embodiments, the housing and the base respectively form a recess adjacent to each other, and the recesses of the housing and the base constitute a depressed structure having a closed shape.

In some embodiments, the connection surface is a fillet surface formed at a corner of the housing, and at least a part of the fillet surface is exposed to a bottom side of the driving mechanism.

An embodiment of the invention further provides a driving mechanism for driving an optical element. The driving mechanism includes a housing, a supporting member, a driving assembly, and a base. The housing includes plastic material, and the optical element is movably received in the housing. The supporting member includes metal material and is embedded in the housing. The driving assembly is disposed in the housing for driving the optical element to move relative to the housing. The base has a plastic main body and a metal member affixed to the main body, wherein the metal member and the supporting member are connected to each other by adhesive, soldering, or welding.

In some embodiments, the supporting member has an L-shaped structure connected to the metal member by adhesive, soldering, or welding.

In some embodiments, the supporting member has a fishbone-shaped structure.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration.

In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
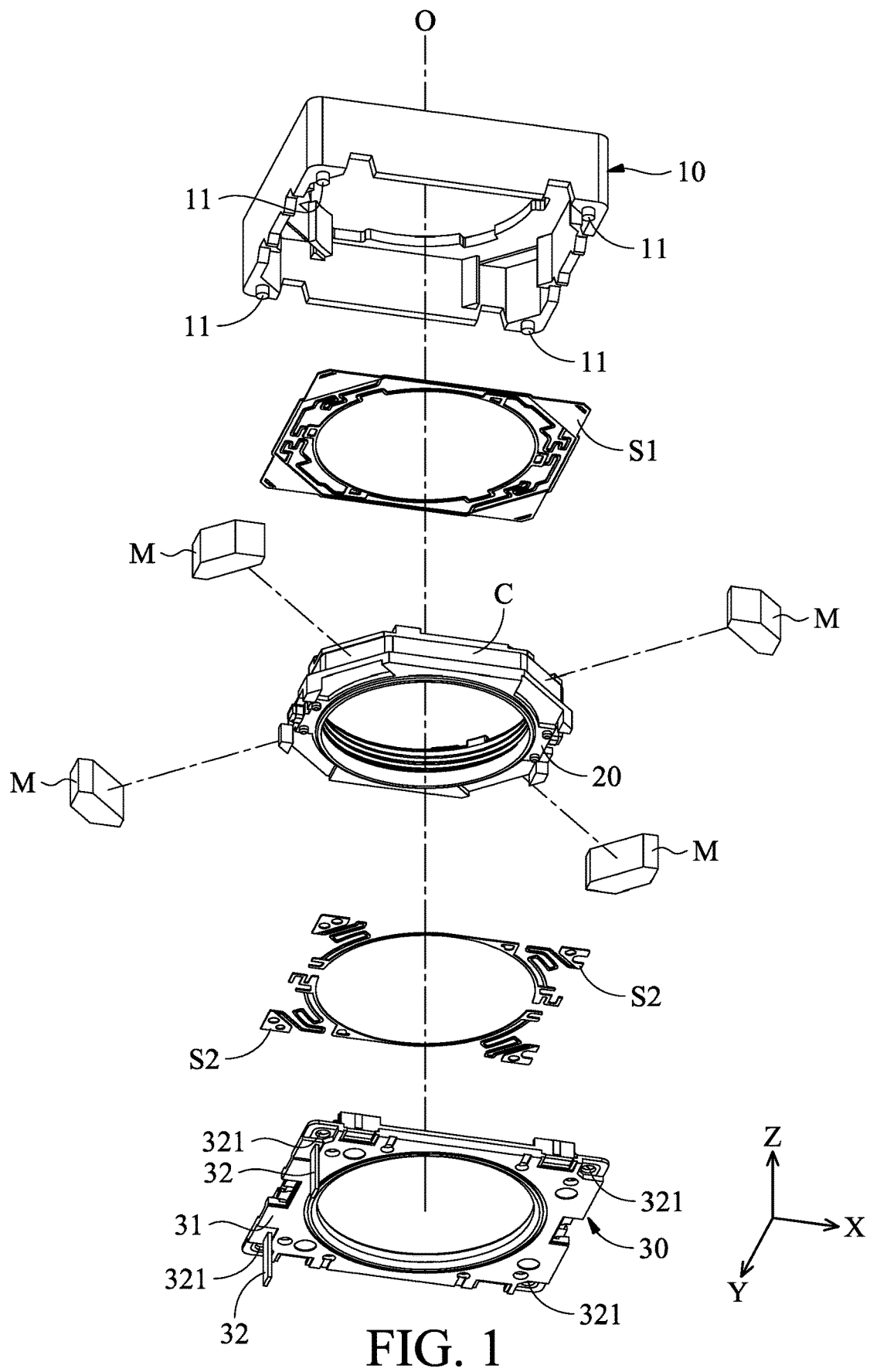
FIGS. 1 and 2 are exploded views of a driving mechanism according to an embodiment of the invention.
Figure 2:
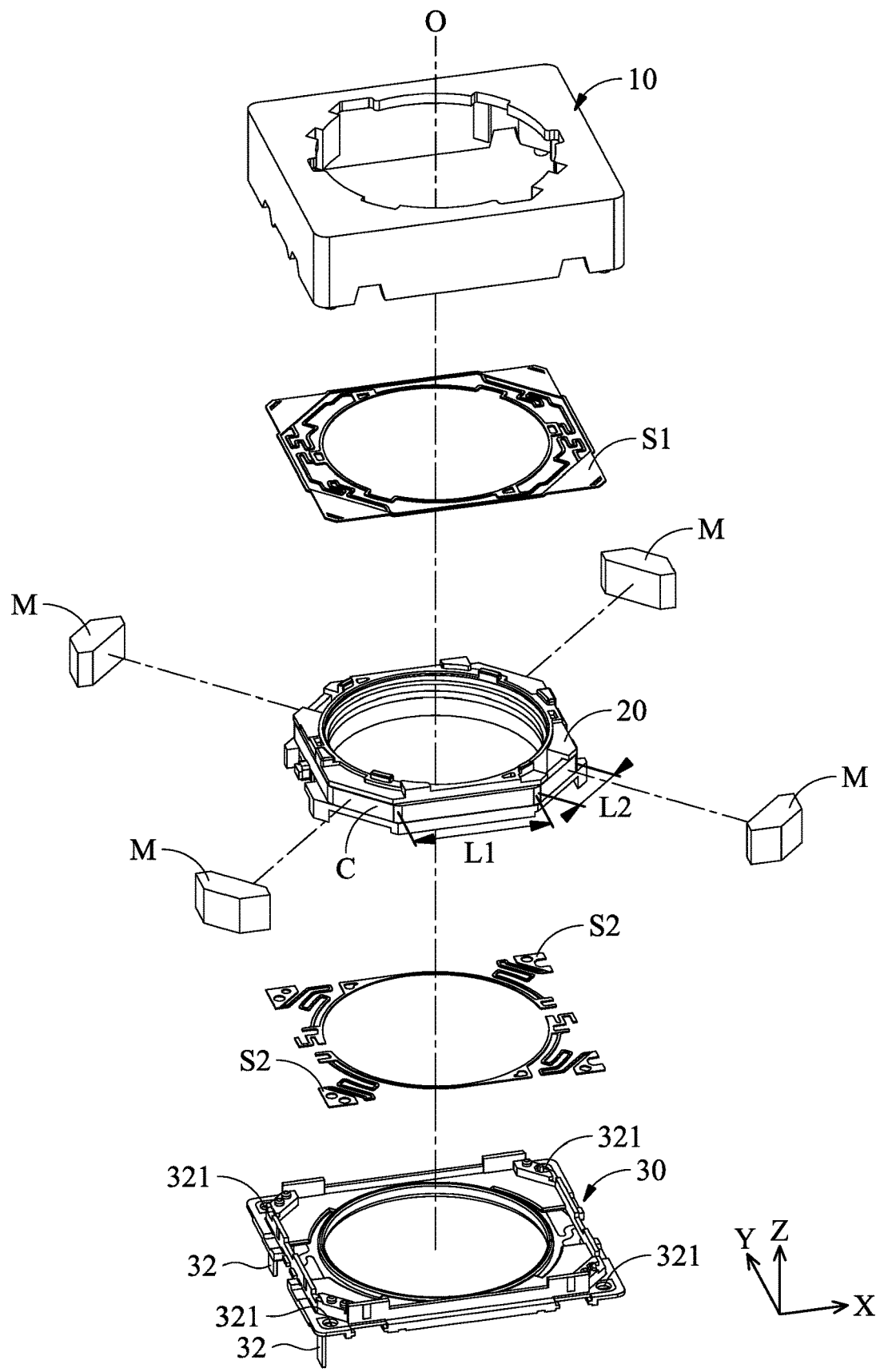
Figure 3:
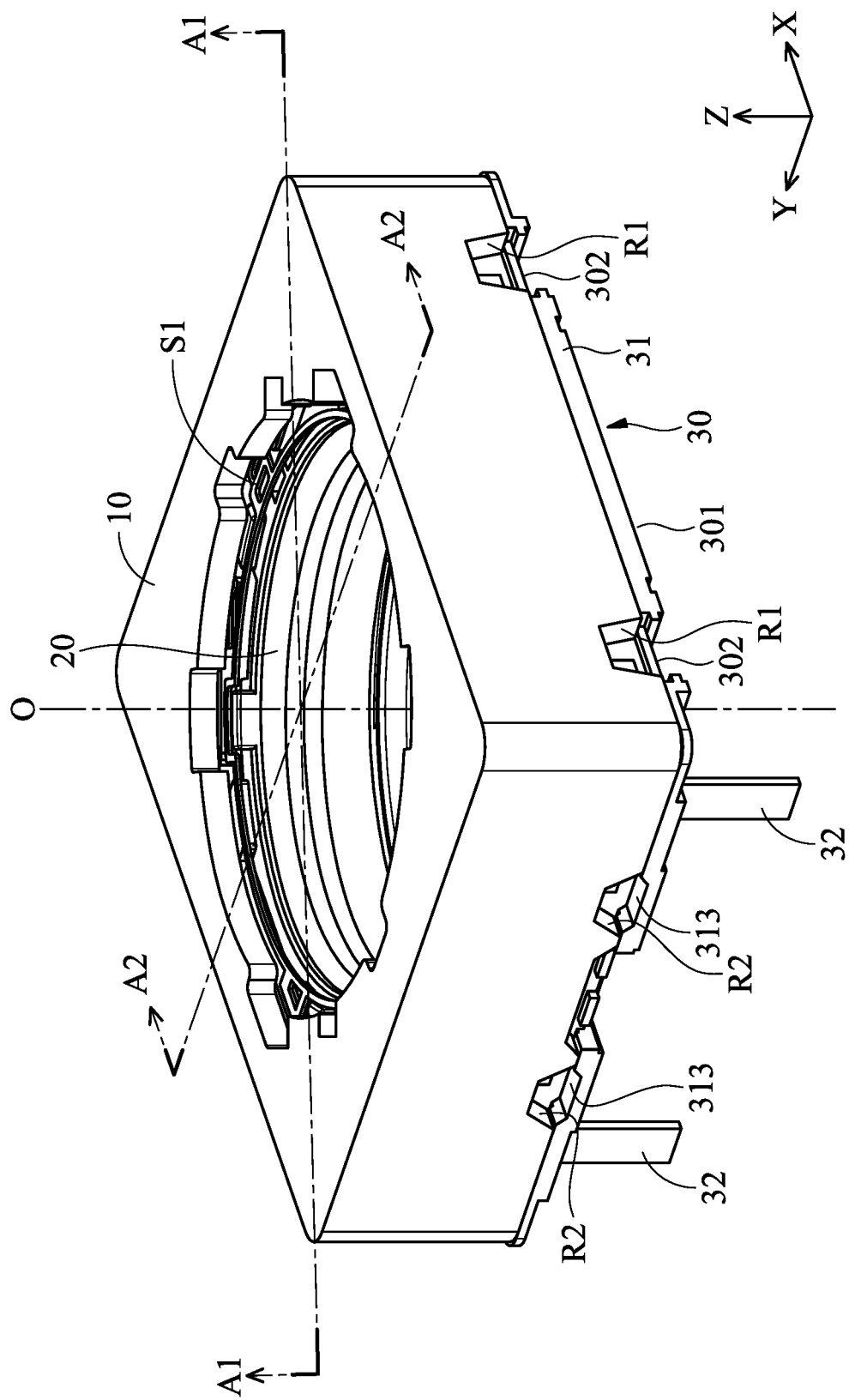
FIG. 3 shows a perspective diagram of the driving mechanism in FIGS. 1 and 2 after assembly.
Figure 4:
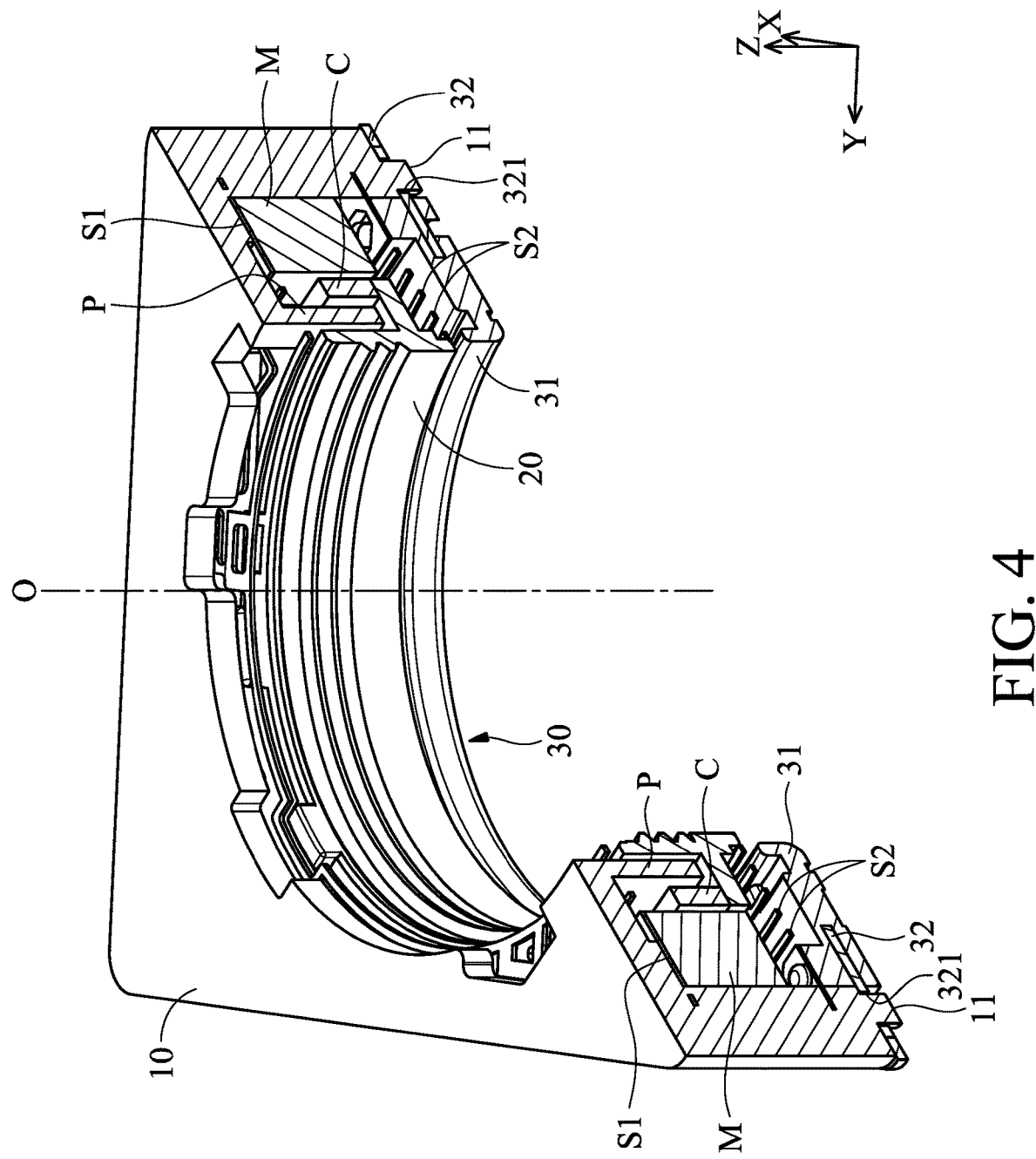
FIG. 4 shows a cross-sectional view taken along line A1-A1 in FIG. 3.

Referring to FIGS. 1-4, FIGS. 1 and 2 are exploded views of a driving mechanism according to an embodiment of the invention, FIG. 3 shows a perspective diagram of the driving mechanism in FIGS. 1 and 2 after assembly, and FIG. 4 shows a cross-sectional view taken along line A1-A1 in FIG. 3. As shown in FIGS. 1 and 2, the driving mechanism in this embodiment is used to drive an optical element (such as an optical lens), which primarily comprises a housing 10, an upper spring S1, a hollow holder 20, a coil C, at least a magnet M, at least a lower spring S2, and a base 30.

It should be noted that the driving mechanism may be disposed in a portable electronic device (e.g. cell phone or tablet computer), and the holder 20 is used for holding an optical element. In this embodiment, the driving mechanism can be electrically connected to an external circuit unit (not shown) for adjusting the position of the optical element. Thus, light can be guided through the optical element and focused onto a photosensitive element (not shown) to generate a clear image, so that auto-focus and auto-zoom control of the optical element can be achieved. Here, the driving mechanism may be a Voice Coil Motor (VCM), and the housing 10 thereof comprises plastic material, so that the communication components in the electronic device can be prevented from signal interference owing to the housing 10.

As clearly shown in FIGS. 3 and 4, the housing 10 and the base 30 can form a case module with the holder 20, the coil C, the upper and lower springs S1 and S2, and the magnets M received therein. The coil C is disposed around the holder 20, and the holder 20 is connected to the housing 10 and the base 30 via the upper and lower springs S1 and S2, respectively. Therefore, the holder 20, the optical element received in the holder 20, and the coil C can be suspended within the housing 10, and can be moved relative to the housing and 10 the base 30 along an optical axis O of the optical element (parallel to the Z axis).

It should be noted that the housing 10 has a quadrilateral structure, and four magnets M are affixed to the four corners of the housing 10, wherein the height of the magnets M corresponds to that of the coil C, as shown in FIG. 4. Additionally, the coil C in FIGS. 1 and 2 has a polygonal structure, wherein one side of coil C not corresponding to the magnet M has a length L1, and another side of coil C corresponding to the magnet M has a length L2, wherein L1>L2.

In this embodiment, the coil C and at least one of the magnets M can constitute a driving assembly, wherein the coil C can be electrically connected to the metal members 32 embedded in the base 30 via conductive wires (not shown), and the metal members 32 can be electrically connected to an external circuit unit for driving the coil C. When the external circuit unit applies a current to the coil C, an electromagnetic force can be generated between the coil C and the magnets M, thus driving the holder 20, the optical element, and the coil C to move along the optical axis O (Z axis) and facilitating auto-focus and/or auto-zoom control of the optical element.

It should be noted that the base 30 primarily comprises a plastic main body 31 and two metal members 32. The metal members 32 may be embedded in the main body 31 by insert molding process. Specifically, at least a first joining structure 11 is formed at a corner of the housing 10, as shown in FIG. 1, and at least a second joining structure 321 is formed on a metal member 32 of the base 30, wherein the second joining structure 321 is exposed to a bottom side of the base 30. During assembly, the first joining structure 11 protruding from the bottom of the housing 10 can be inserted through the second joining structure 321, to enhance the connection between the housing 10 and the base 30.

Referring to FIG. 3, two recesses R1 and R2 are formed on the bottom side of the housing 10. The recess R1 corresponds to an opening portion 302 of the base 30, and the recess R2 corresponds to another recess 313 of the base 30. During assembly, the recesses R1, R2, 313 and the opening portion 302 can receive and guide the glue to flow, so as to facilitate robust connection between the housing 10 and the base 30.

As shown in FIG. 4, the housing 10 further forms at least a stopper P extended downward along the −Z direction to a recess of the holder 20 and situated between the holder 20 and the coil C. When the holder 20 and the optical element received therein are impacted by an external force to rotate relative to the housing 10, the stopper P can contact the holder 20 to restrict the holder 20 and the optical element in a limit position, so that structural deformation and failure due to excessive rotation of the holder 20 can be avoided. Additionally, since the holder 20 and the housing 10 both comprise plastic material with flexibility, structural cracks and undesired particles would not be generated when the stopper P contacts the holder 20.

Figure 5:
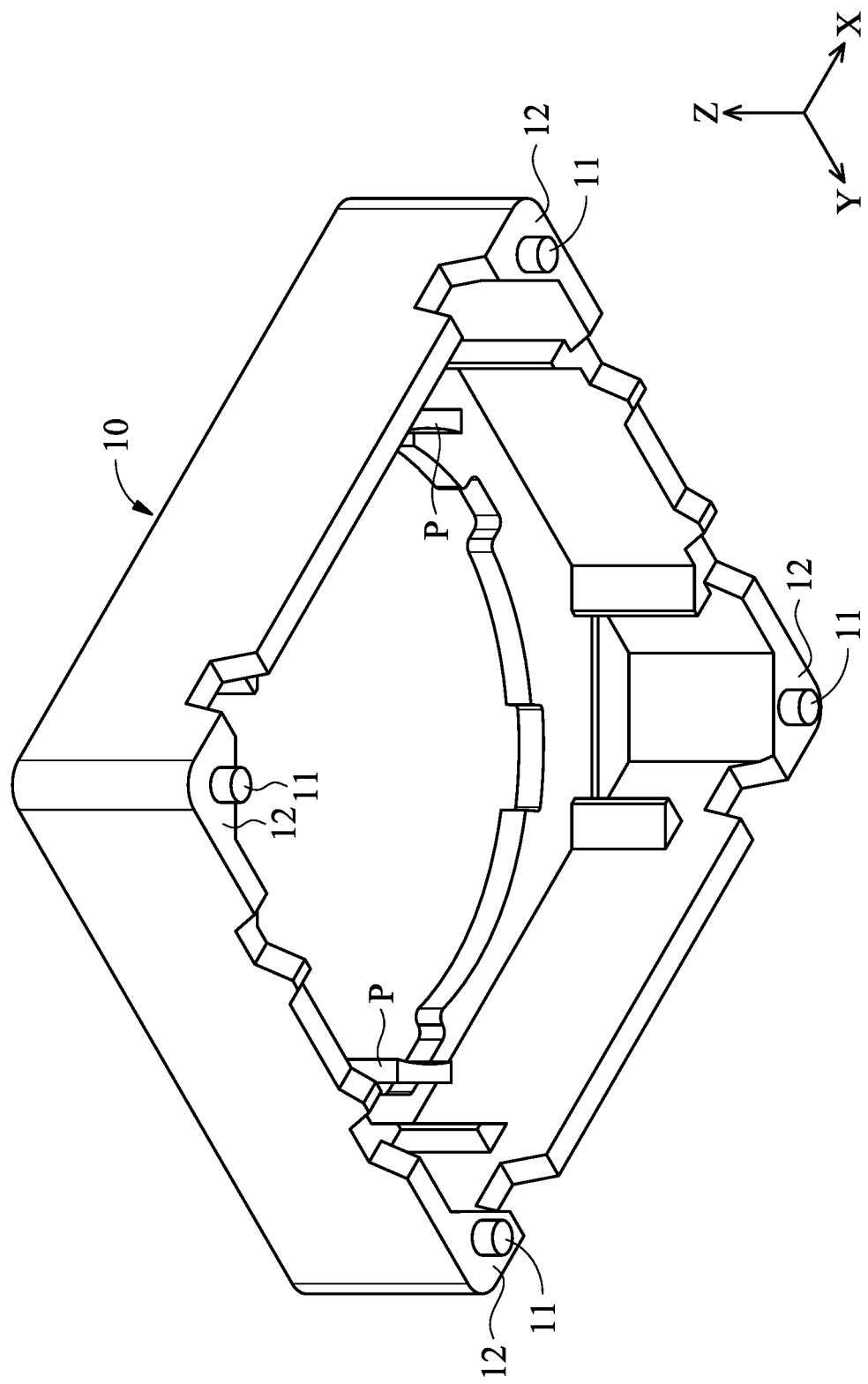
FIG. 5 shows a housing 10 according to an embodiment of the invention.
Figure 6:
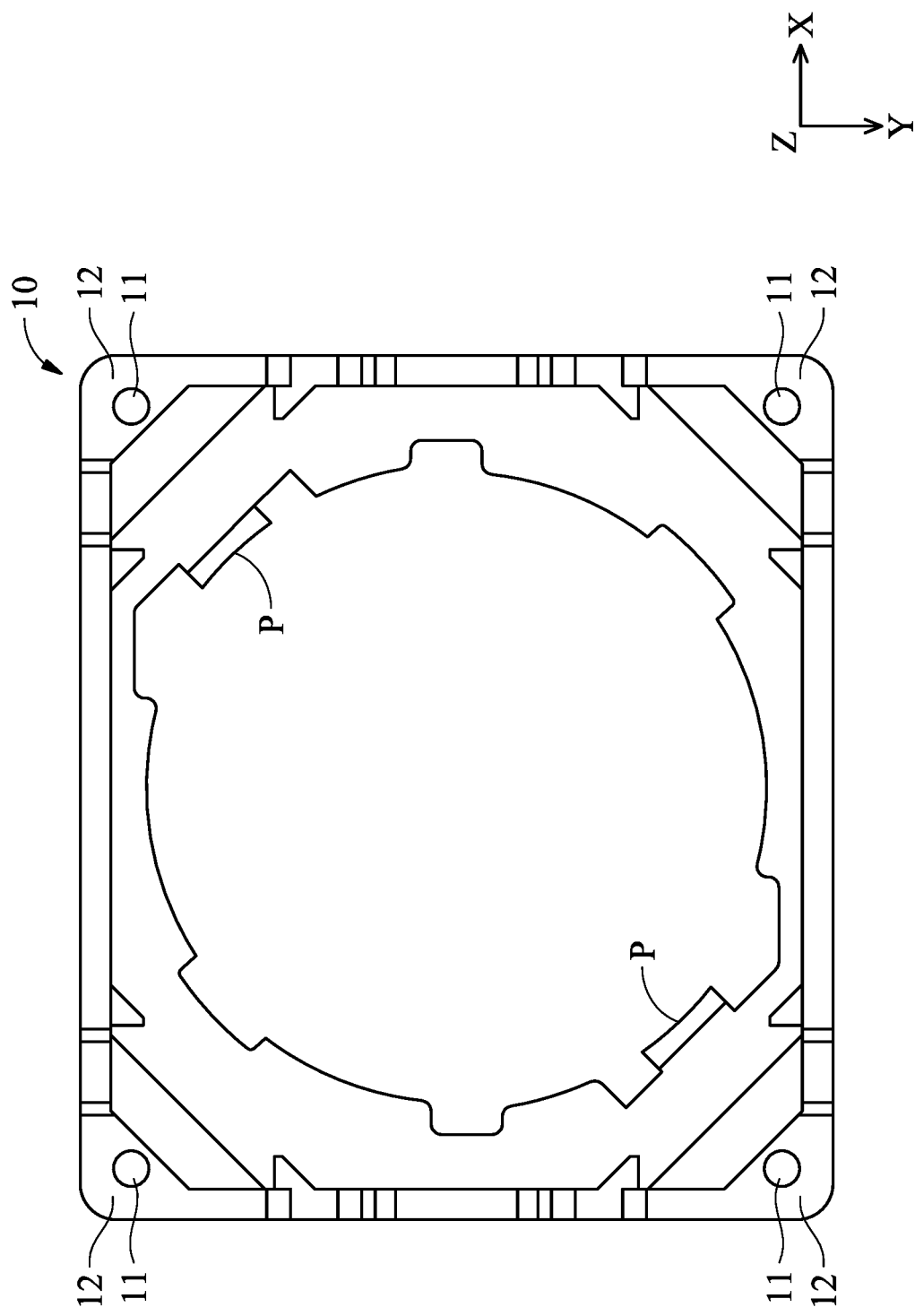
FIG. 6 shows a bottom view of the housing 10 of FIG. 5.

FIG. 5 shows a housing 10 according to an embodiment of the invention, and FIG. 6 shows a bottom view of the housing 10 of FIG. 5. As shown in FIGS. 5 and 6, at least a thickened portion 12 is formed at a corner of the housing 10, wherein the first joining structure 11 protrudes from a surface of the thickened portion 12 in the −Z direction.

Figure 7:
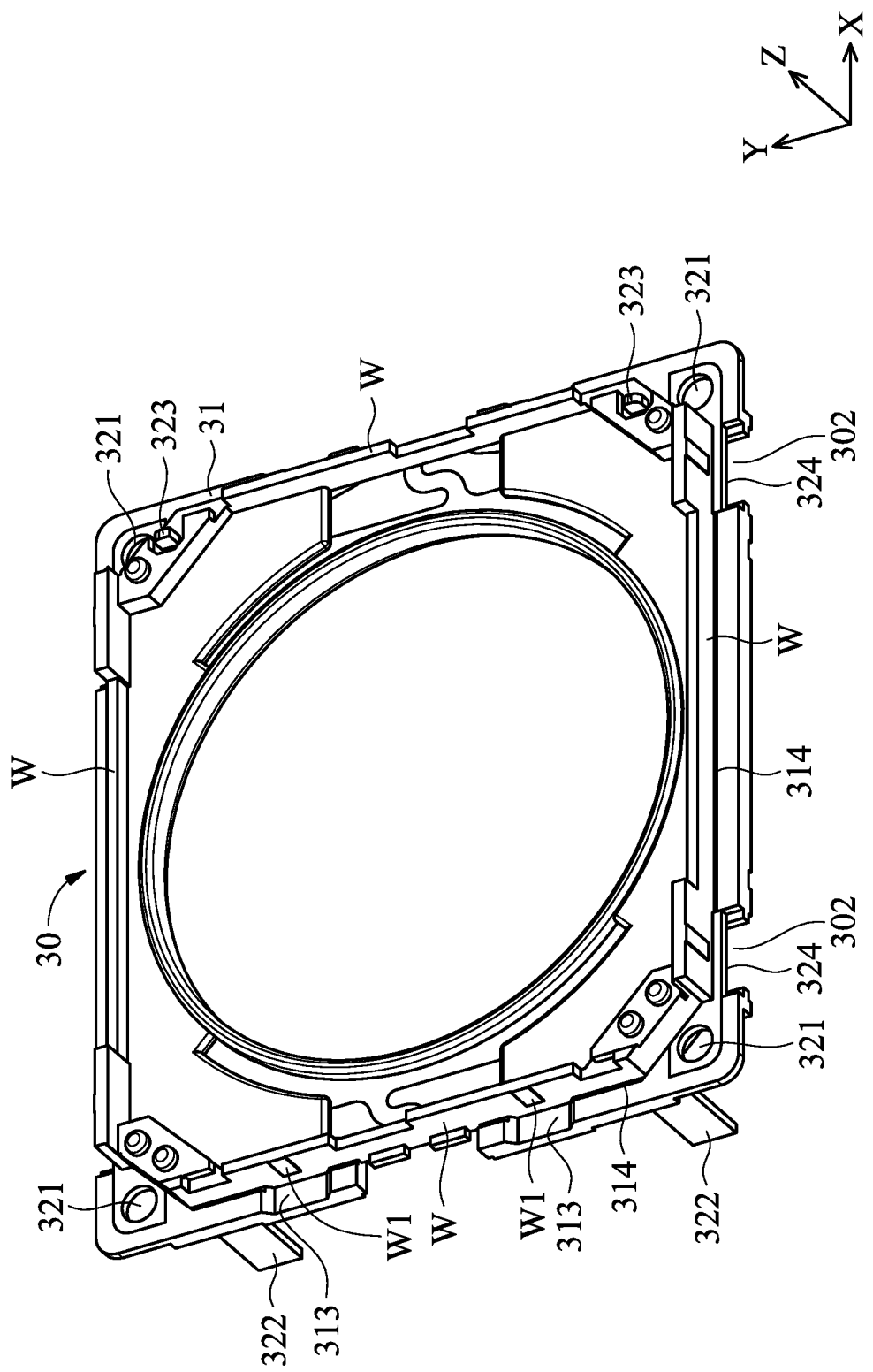
FIG. 7 shows a perspective diagram of a base 30 according to an embodiment of the invention.
Figure 8:
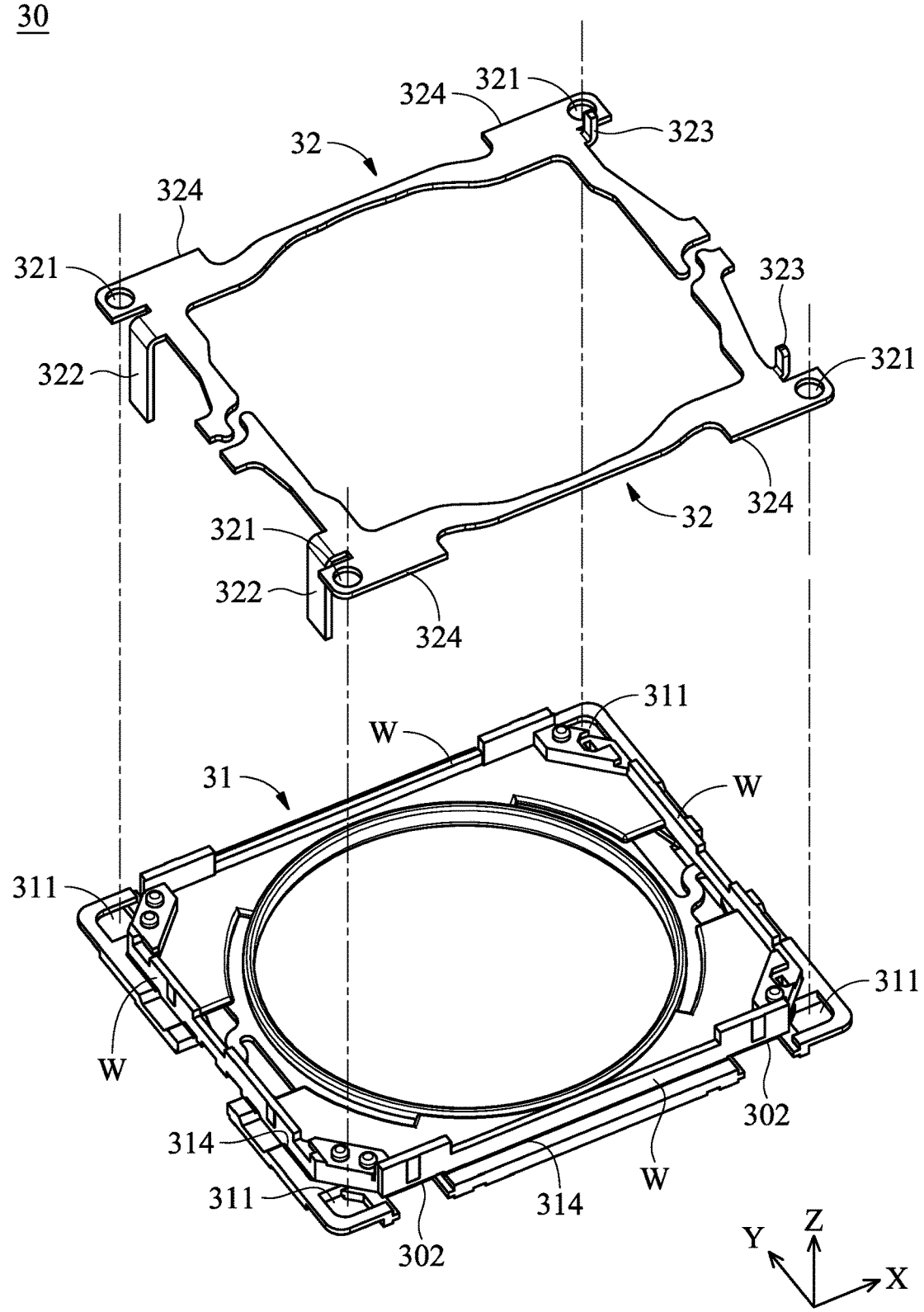
FIG. 8 shows an exploded view of the base 30 of FIG. 7.

FIG. 7 shows a perspective diagram of a base 30 according to an embodiment of the invention, and FIG. 8 shows an exploded view of the base 30 of FIG. 7. As shown in FIGS. 7 and 8, the base 30 comprises a plastic main body 31 and two metal members 32, wherein two conductive pins 322 and 323 are formed on opposite sides of the metal member 32. The conductive pin 322 can be electrically connected to the external circuit unit, and the conductive pin 323 can be electrically connected to the lower spring S2 and the coil C. Thus, the external circuit unit can provide a current to the coil C, thus driving the holder 20 and the optical element to move relative to the housing 10 and the base 30.

In FIGS. 5-8, the first joining structure 11 forms a protrusion on the housing 10 that extends in the −Z direction, and the second joining structure 321 forms a through hole on the metal member 32 that also extends in the −Z direction and is located corresponding to an opening 311 on the main body 31 of the base 30 (FIG. 8). In some embodiments, the first joining structure 11 may form a cavity, and the second joining structure 321 may form a protrusion on the base 30 and extend into the cavity, so that the first and second joining structures 11 and 321 can be firmly connected to each other.

Still referring to FIGS. 7 and 8, at least a wall W and a channel 314 are formed on a side of the main body 31 of the base 30, so that the glue applied between the housing 10 and the base 30 can be received and guided, thus preventing overflow of the glue during assembly and facilitating robust connection between the housing 10 and the base 30. Additionally, at least a rib portion 324 is formed on the metal member 32 and exposed to the opening portion 302 on the main body 31 of the base 30.

Figure 9:
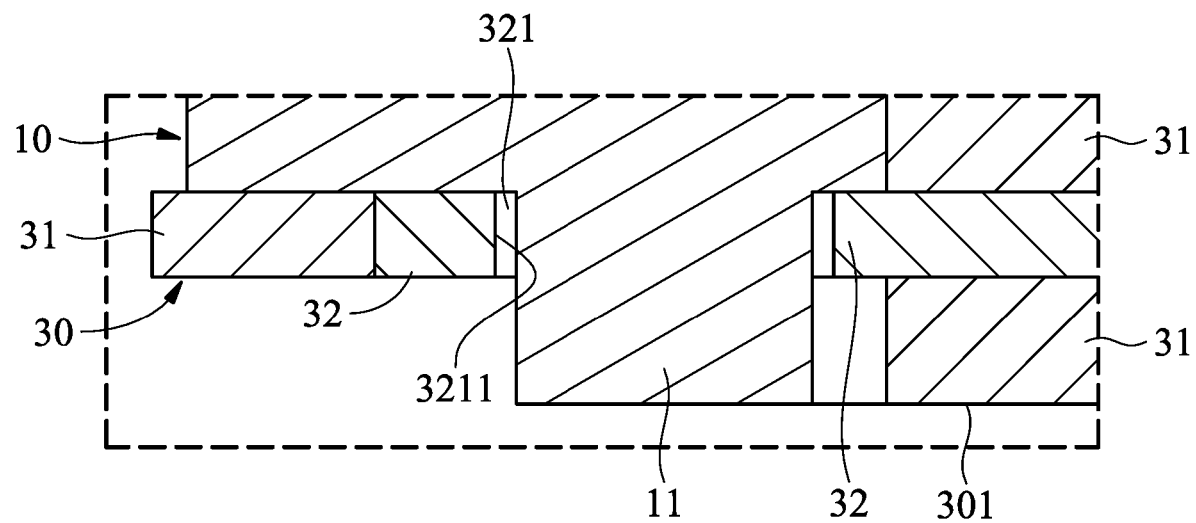
FIG. 9 shows an enlarged cross-sectional view of a first joining structure 11 of the housing 10 extending through a second joining structure 321 of the base 30.
Figure 10:
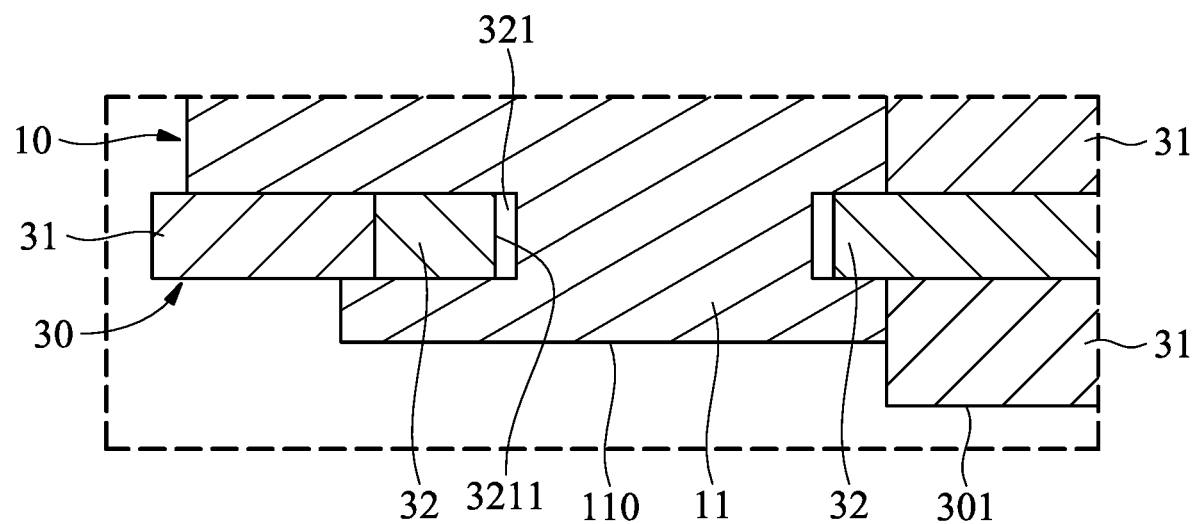
FIG. 10 shows the first joining structure 11 in FIG. 9 which is processed by hot pressing to form a T-shaped end portion.

FIG. 9 shows an enlarged cross-sectional view of a first joining structure 11 of the housing 10 extending through a second joining structure 321 of the base 30. FIG. 10 shows the first joining structure 11 in FIG. 9 which is processed by hot pressing to form a T-shaped end portion. Referring to FIG. 9, during assembly of the driving mechanism, the first joining structure 11 (protrusion) on the bottom side of the housing 10 can be inserted through the second joining structure 321 (through hole) on the base 30, wherein an end portion of the first joining structure 11 protrudes from a lower surface of the metal member 32. Since the housing 10 has plastic material with flexibility, the first and second joining structures 11 and 321 can be directly joined to each other by press-fitting.

Alternatively, the glue may also be applied to an inner surface of the second joining structure 321 to enhance the connection between the first and second joining structures 11 and 321. It should be noted that the second joining structure 321 forms a connection surface 3211 for directly or indirectly connecting to the first joining structure 11, wherein the connection surface 3211 faces the first joining structure 11 and the optical axis O of the optical element.

Referring to FIG. 10, the first joining structure 11 can be further processed to form a T-shaped end portion and facilitate robust connection between the housing 10 and the base 30. In this embodiment, an end surface 110 of the first joining structure 11 has a height (along the vertical direction and parallel to the optical axis O) between the metal member 32 and a bottom surface 301 of the main body 31.

In some embodiments, the T-shaped end portion of the first joining structure 11 may contact the main body 31, so that the T-shaped end portion and the main body 31 can be bonded to each other by ultrasonic welding to enhance the connection strength therebetween.

Figure 11:
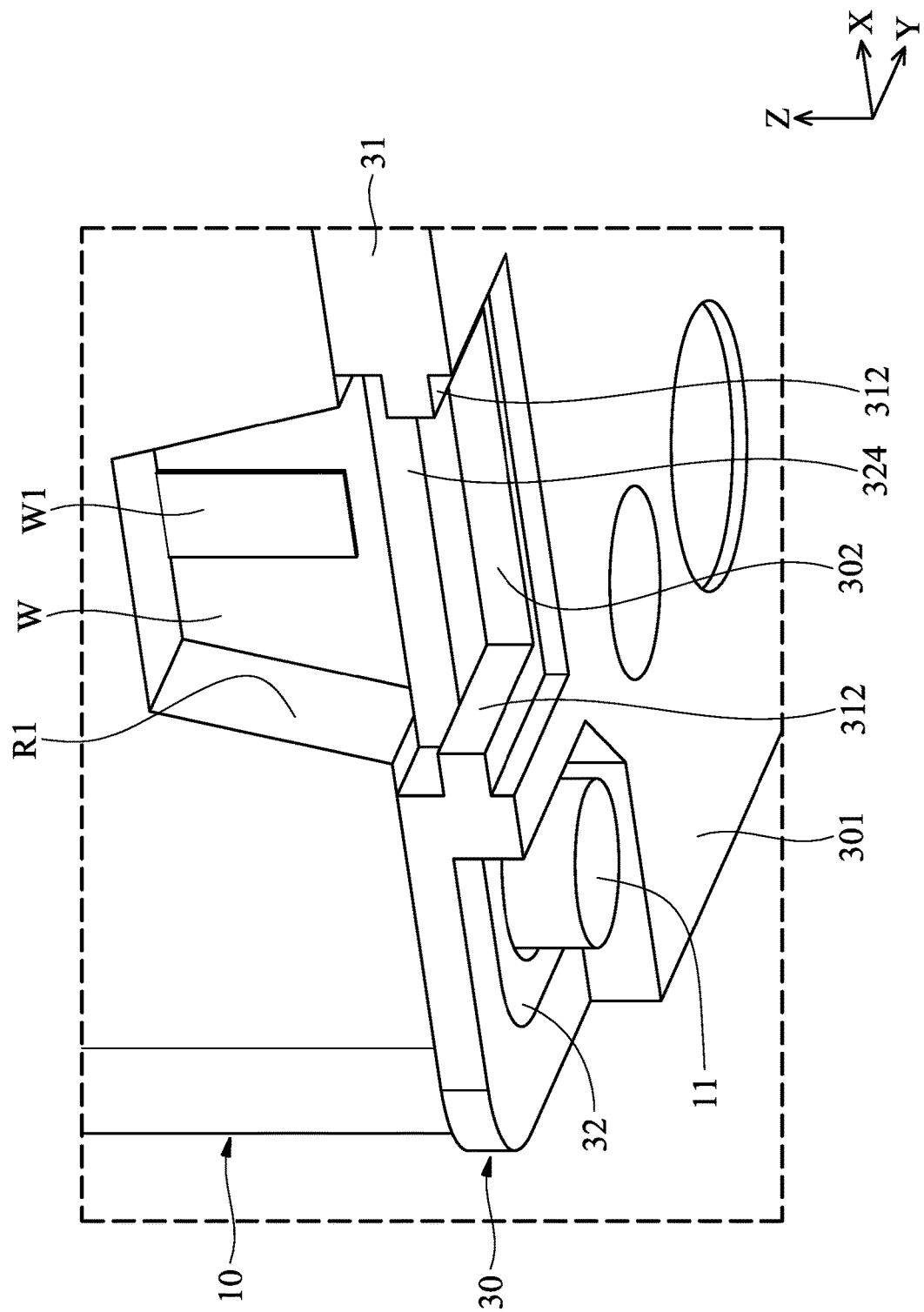
FIG. 11 shows a partial enlarged view of a driving mechanism according to an embodiment of the invention.

FIG. 11 shows a partial enlarged view of a driving mechanism according to an embodiment of the invention. Referring to FIG. 11, a protrusion W1 is formed on the wall W of the base 30 and located corresponding to the recess R1 of the housing 10 and the opening portion 302 of the base 30. As the protrusion W1 protrudes from an outer surface of the wall W and abuts an inner surface of the housing 10, a gap can be formed between the wall W and the housing 10 for receiving the glue, and the positioning accuracy between the wall W and the housing 10 can also be increased.

Still referring to FIG. 11, the main body 31 of the base 30 forms at least an opening portion 302 and at least a rib 312 located in the opening portion 302. As the rib 312 protrudes from the opening portion 302 along an inward direction (X or −X direction), the contact area between the glue and the base 30 can be increased, and the adhesion strength between the base 30 and the housing 10 can be enhanced, wherein the inward direction is not parallel to the Z axis or the optical axis O. Moreover, as shown in FIG. 11, a rib portion 324 of the metal member 32 is also located in the opening portion 302, and it protrudes from the opening portion 302 along an outward direction (−Y direction) of the base 30, wherein the outward direction is not parallel to the Z axis or the optical axis O.

Figure 12:
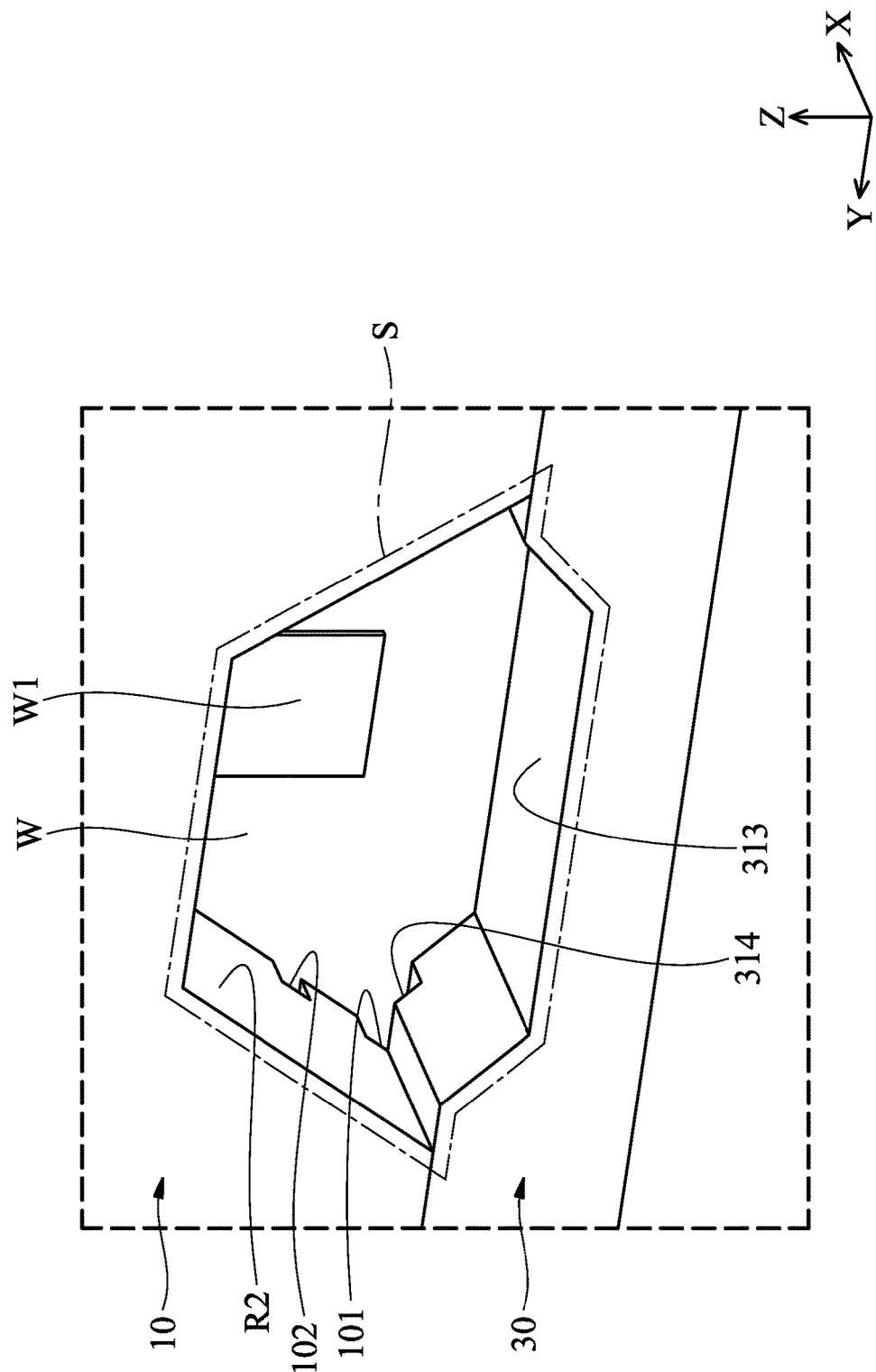
FIG. 12 shows another partial enlarged view of a driving mechanism according to an embodiment of the invention.

FIG. 12 shows another partial enlarged view of a driving mechanism according to an embodiment of the invention. Referring to FIG. 12, the housing 10 and the base 30 respectively have a recess R2 and a recess 313 adjacent to each other, wherein the recesses R2 and 313 are connected to constitute a depressed structure S that has a closed shape. Moreover, two channels 101 and 102 are formed on the inner surface of the housing 10 and adjacent to the wall W, and a channel 314 is formed on the base 30. As the glue can be received and guided to flow through the channels 101, 102, and 314 between the housing 10 and the base 30, the adhesion area and connection strength between the housing 10 and the base 30 can be greatly increased.

Figure 13:
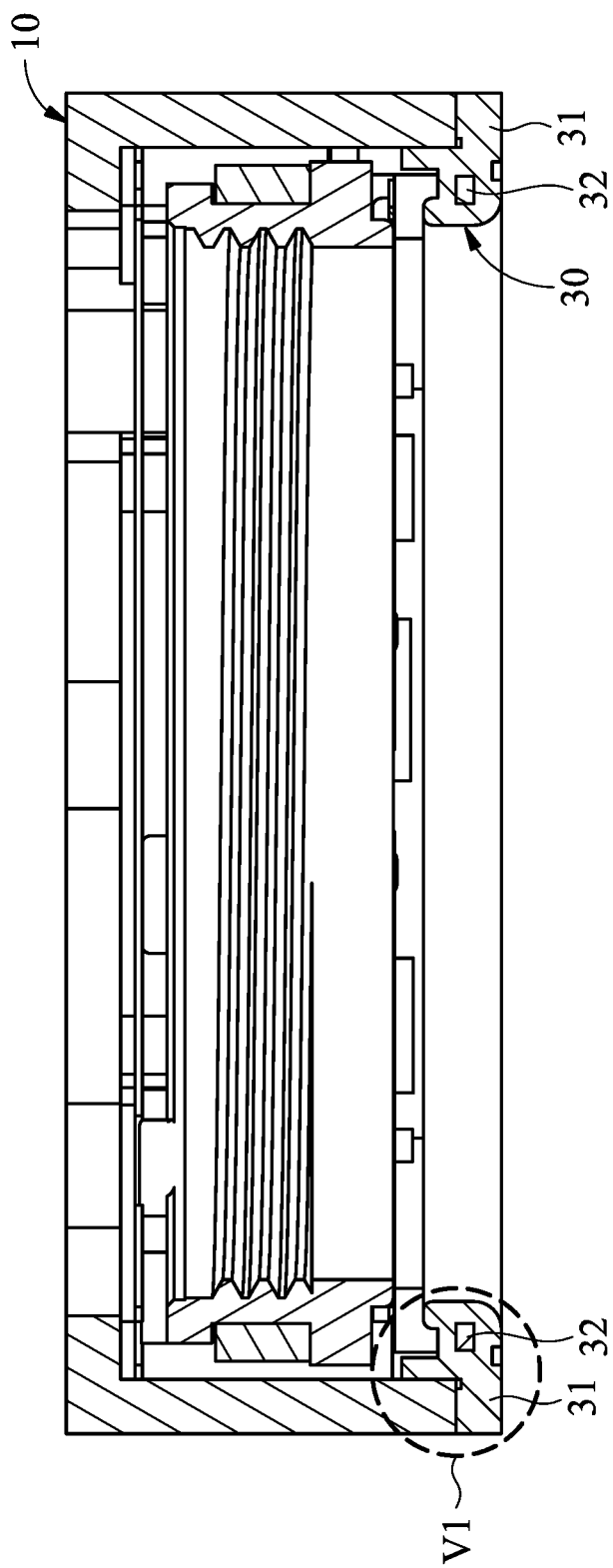
FIG. 13 shows a cross-sectional view taken along line A2-A2 in FIG. 3.
Figure 14:
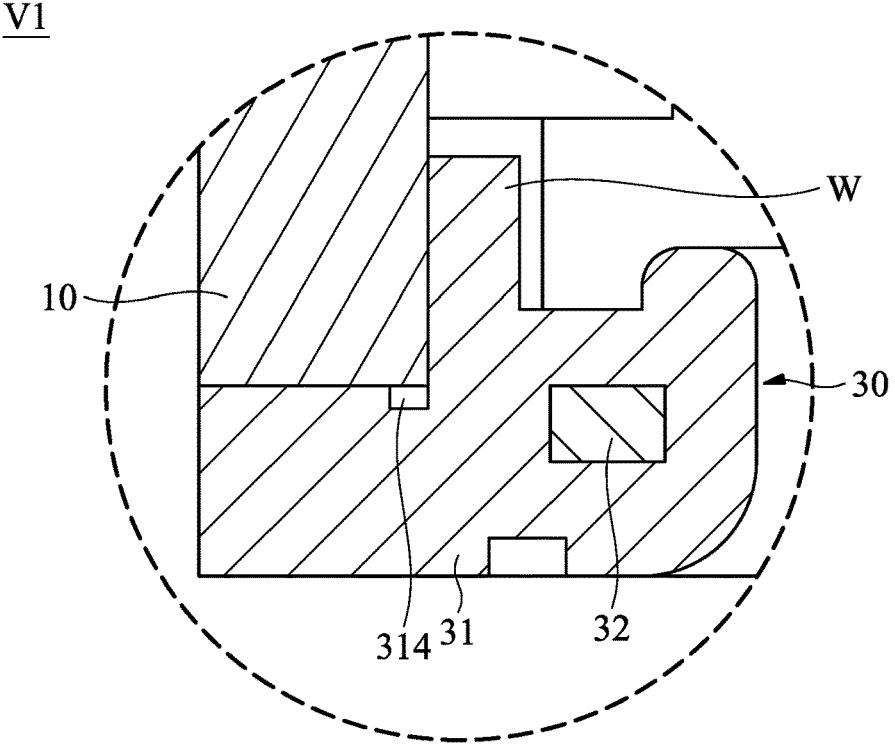
FIG. 14 shows an enlarged view of the portion V1 in FIG. 13.
Figure 15:
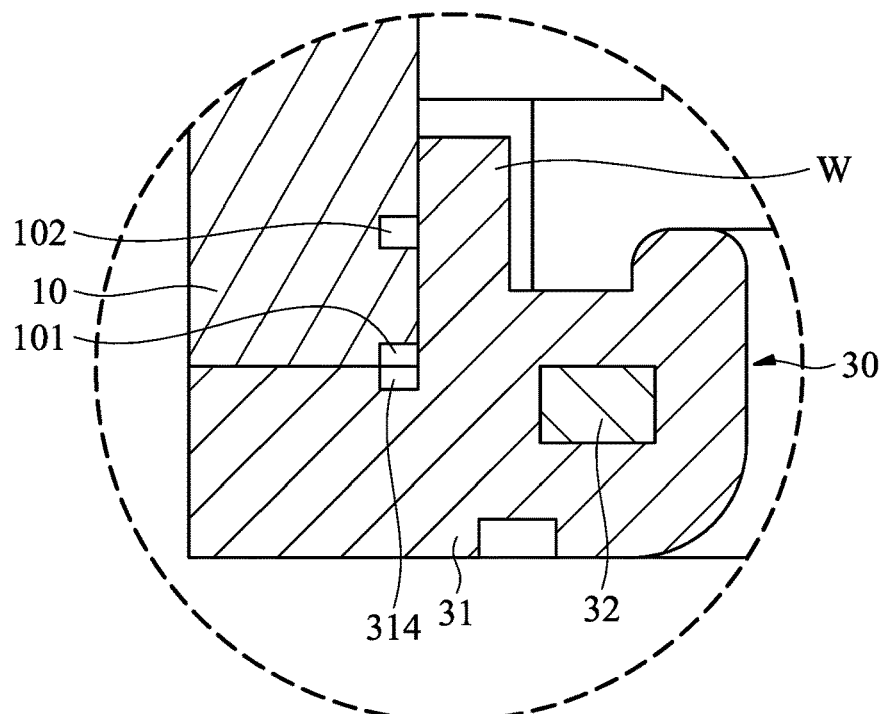
FIG. 15 shows an enlarged cross-sectional view of a driving mechanism according to another embodiment of the invention.

FIG. 13 shows a cross-sectional view taken along line A2-A2 in FIG. 3, and FIG. 14 shows an enlarged view of the portion V1 in FIG. 13. As shown in FIGS. 13 and 14, the main body 31 of the base 30 forms a channel 314 adjacent to the wall W and the housing 10 for guiding the glue to flow between the housing 10 and the base 30. Furthermore, in the driving mechanism shown in FIG. 15 according to another embodiment of the invention, the channels 101 and/or 102 may be formed on an inner surface of the housing 10 to guide the glue to flow, so that the adhesion strength between the housing 10 and the base 30 can be efficiently increased, wherein the channel 101 is located at the edge of the inner surface.

Figure 16:
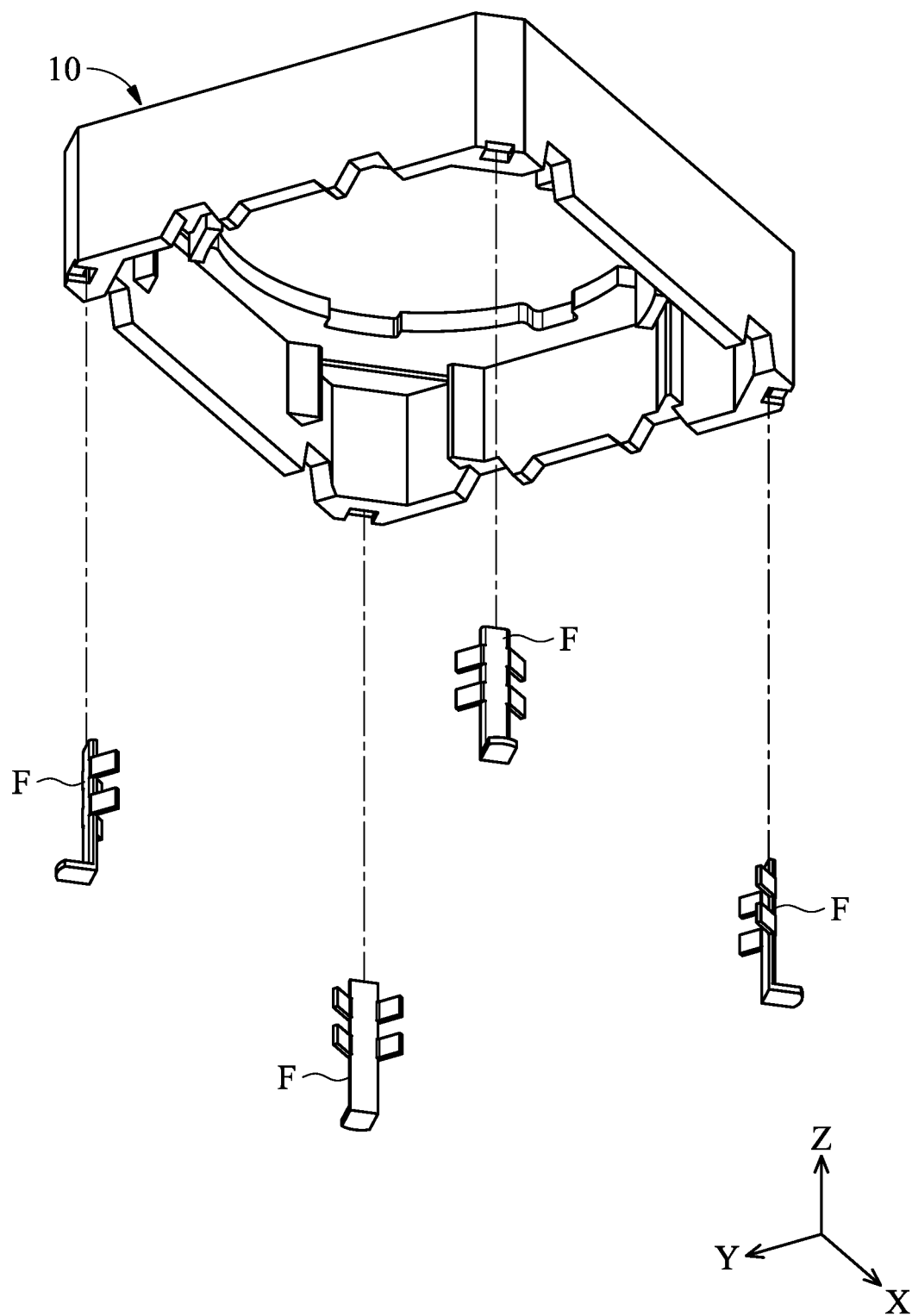
FIG. 16 shows an exploded view of a housing 10 and several supporting members F according to another embodiment of the invention.
Figure 17:
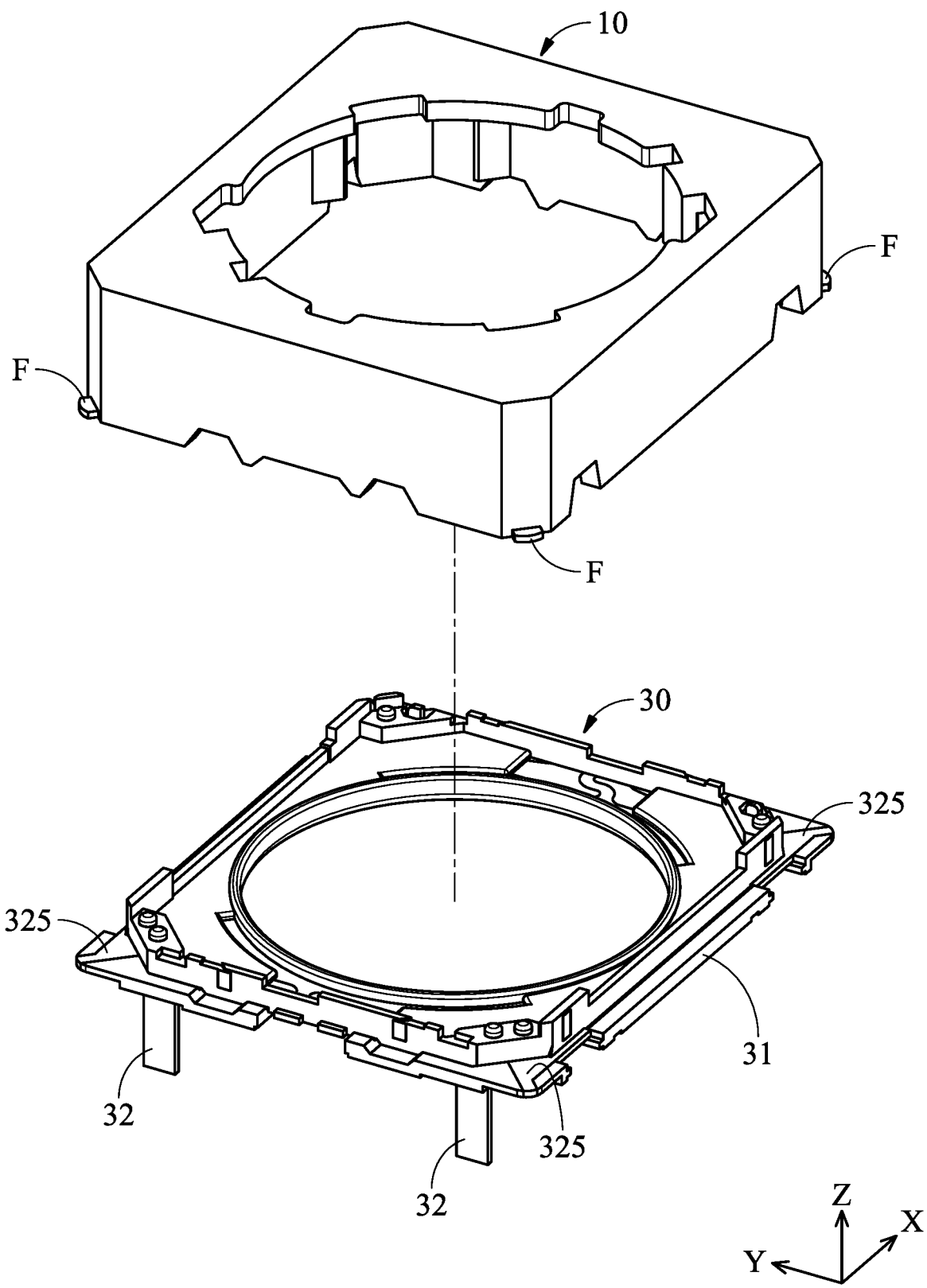
FIG. 17 shows an exploded view of the housing 10 in FIG. 16 with the supporting members F embedded therein and a base 30.

FIG. 16 shows an exploded view of a housing 10 and several supporting members F according to another embodiment of the invention, and FIG. 17 shows an exploded view of the housing 10 in FIG. 16 with the supporting members F embedded therein and a base 30. Referring to FIGS. 16 and 17, the housing 10 comprises plastic material, and the metal supporting members F may be embedded in the housing 10 by insert molding, so that the structural strength of the housing 10 can be enhanced. Here, each of the supporting members F has a fishbone-shaped structure embedded at the corners of the housing 10.

It should be noted that the housing 10 and the base 30 can form a case module of the driving mechanism, wherein the holder 20, the coil C, the upper and lower springs S1 and S2, and the magnets M shown in FIG. 1 can be accommodated in the case module. As mentioned above, an optical element can be held by the holder 20, and the holder 20 and the optical element received therein can be driven to move relative to the housing 10 by the coil C and the magnets M, so as to achieve auto-focus and auto-zoom control of the optical element.

Figure 18:
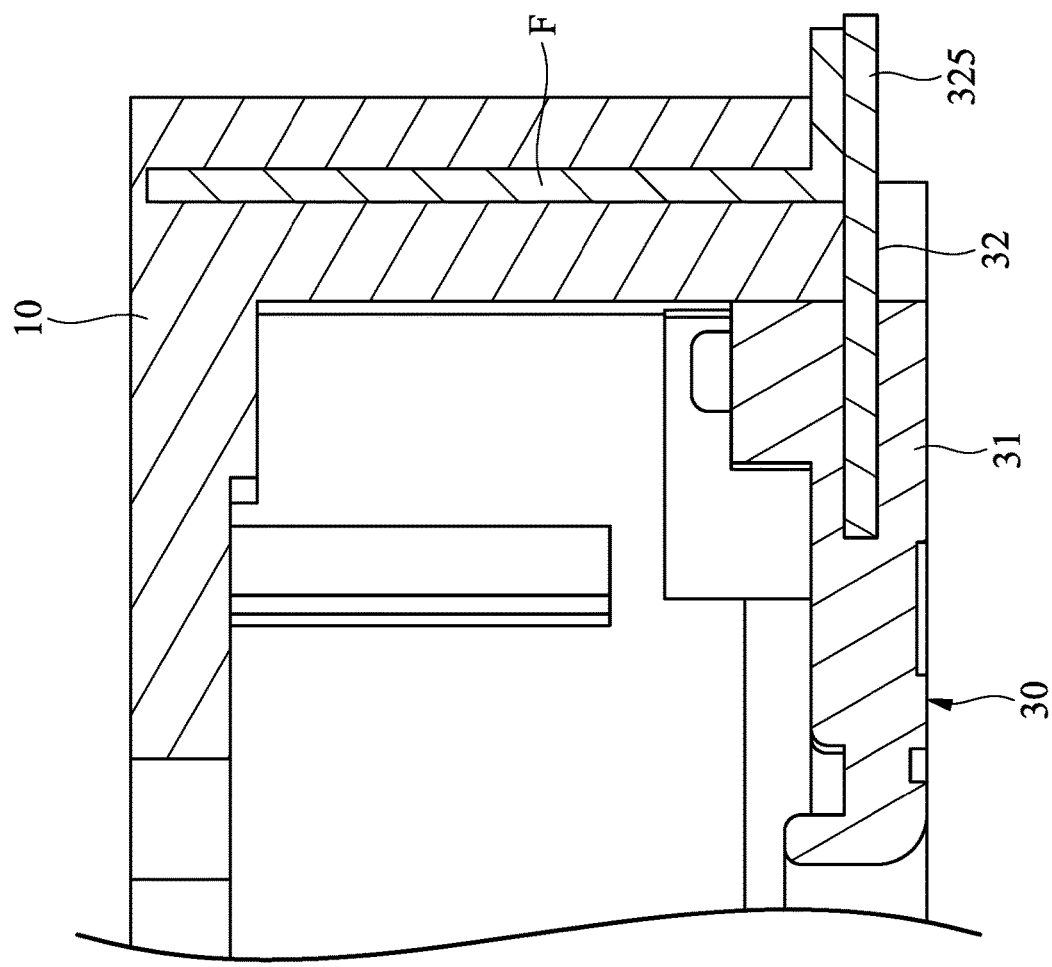
FIG. 18 shows an enlarged partial cross-sectional view of the housing 10 and the base 30 after assembly.

FIG. 18 shows an enlarged partial cross-sectional view of the housing 10 and the base 30 after assembly. Referring to FIGS. 17 and 18, a lower portion of the supporting member F forms an L-shaped structure protruding from an outer surface of the housing 10. Additionally, the base 30 has a plastic main body 31 and at least a metal member 32 embedded in the main body 31, wherein the metal member 32 forms a connection portion 325 connected to the L-shaped structure of the supporting member F, such as by adhesive, soldering or welding. Since the supporting member F has electrical conductivity, it can also be used to electrically connect the coil C in the housing 10 with the metal member 32 on the base 30.

Figure 19:
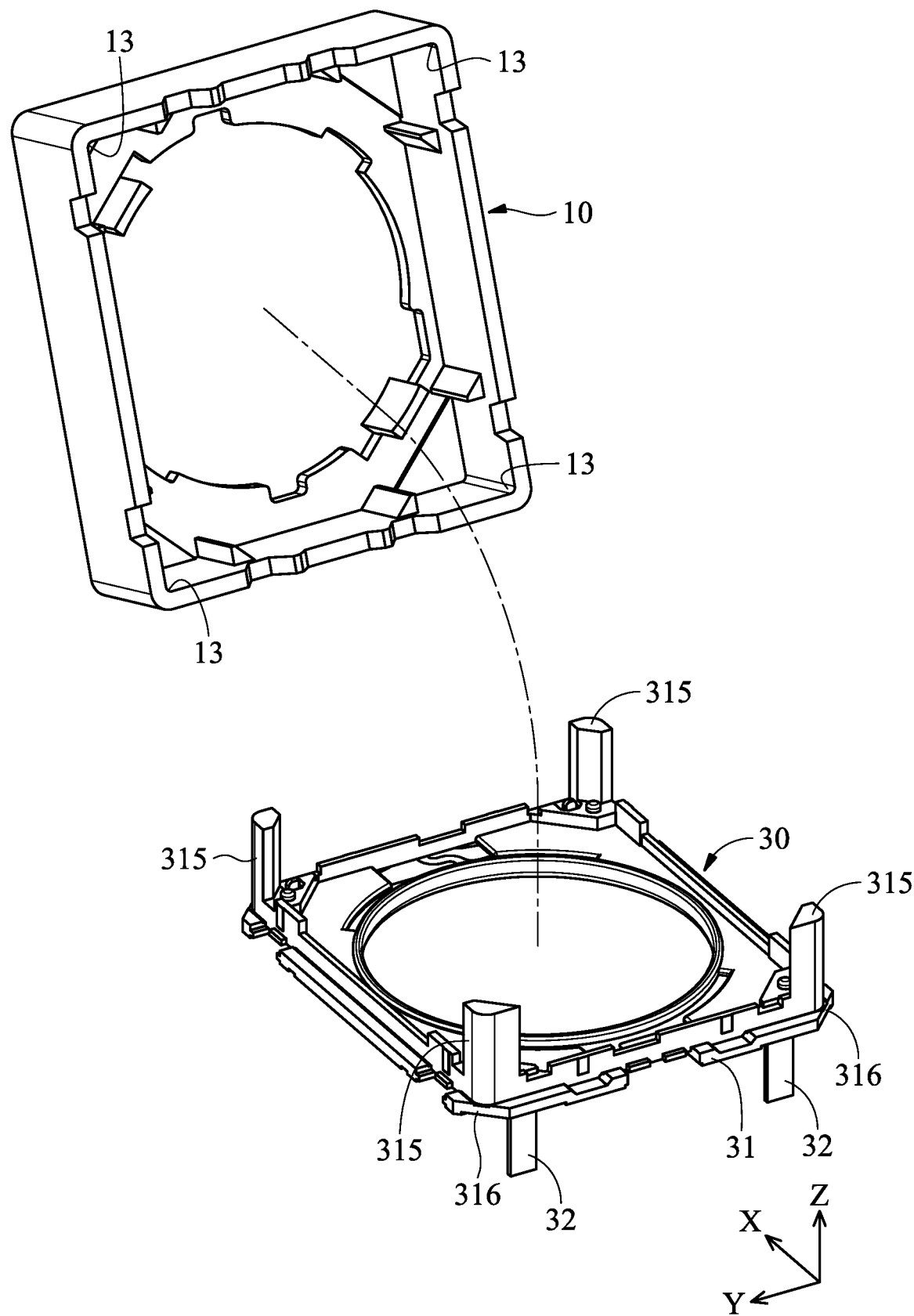
FIG. 19 shows an exploded view of a housing 10 and a base 30 according to another embodiment of the invention.
Figure 20:
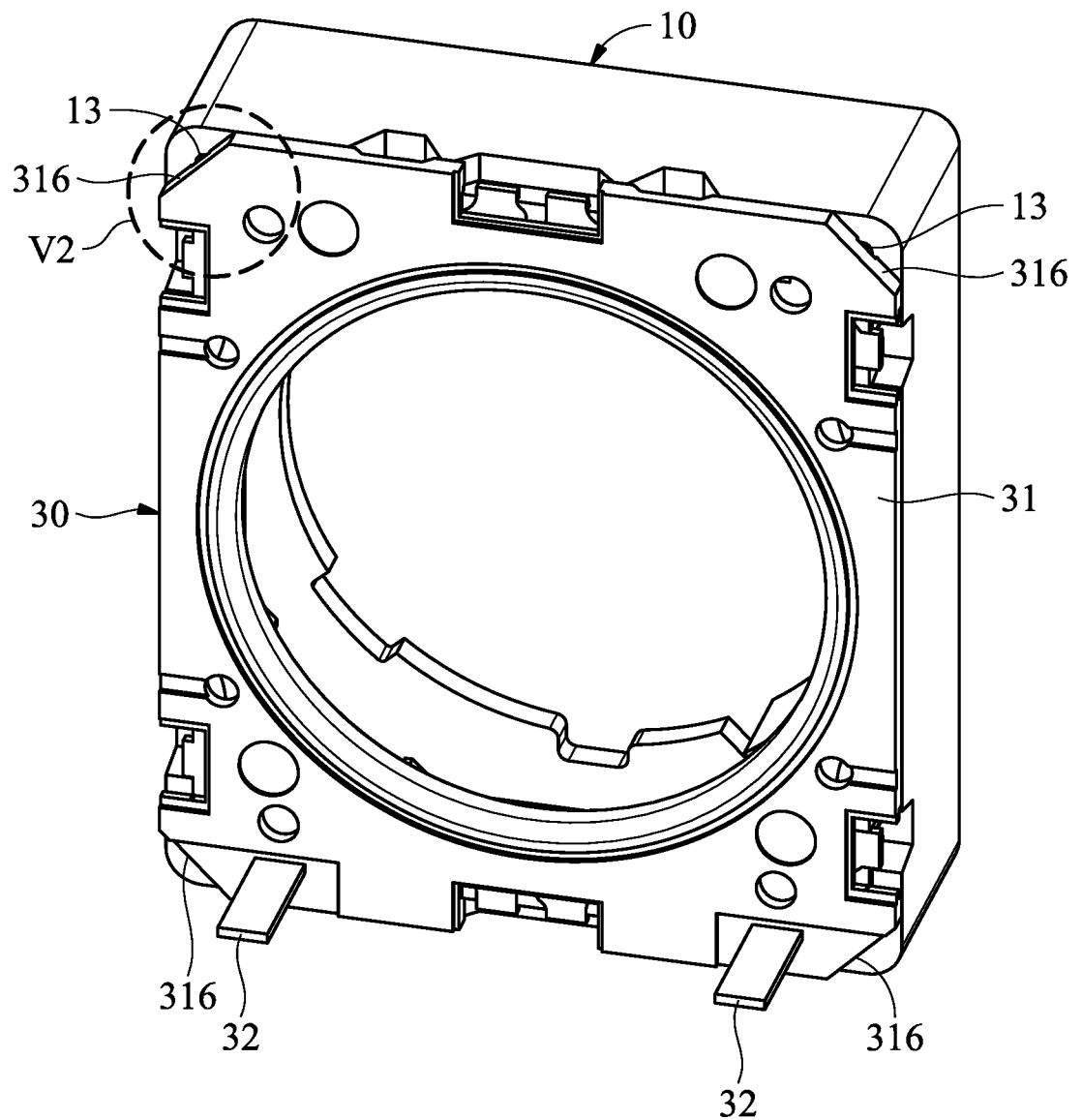
FIG. 20 shows a perspective diagram of the housing 10 and the base 30 in FIG. 19 after assembly.
Figure 20:
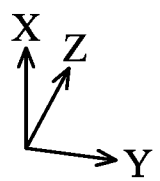
Figure 21:
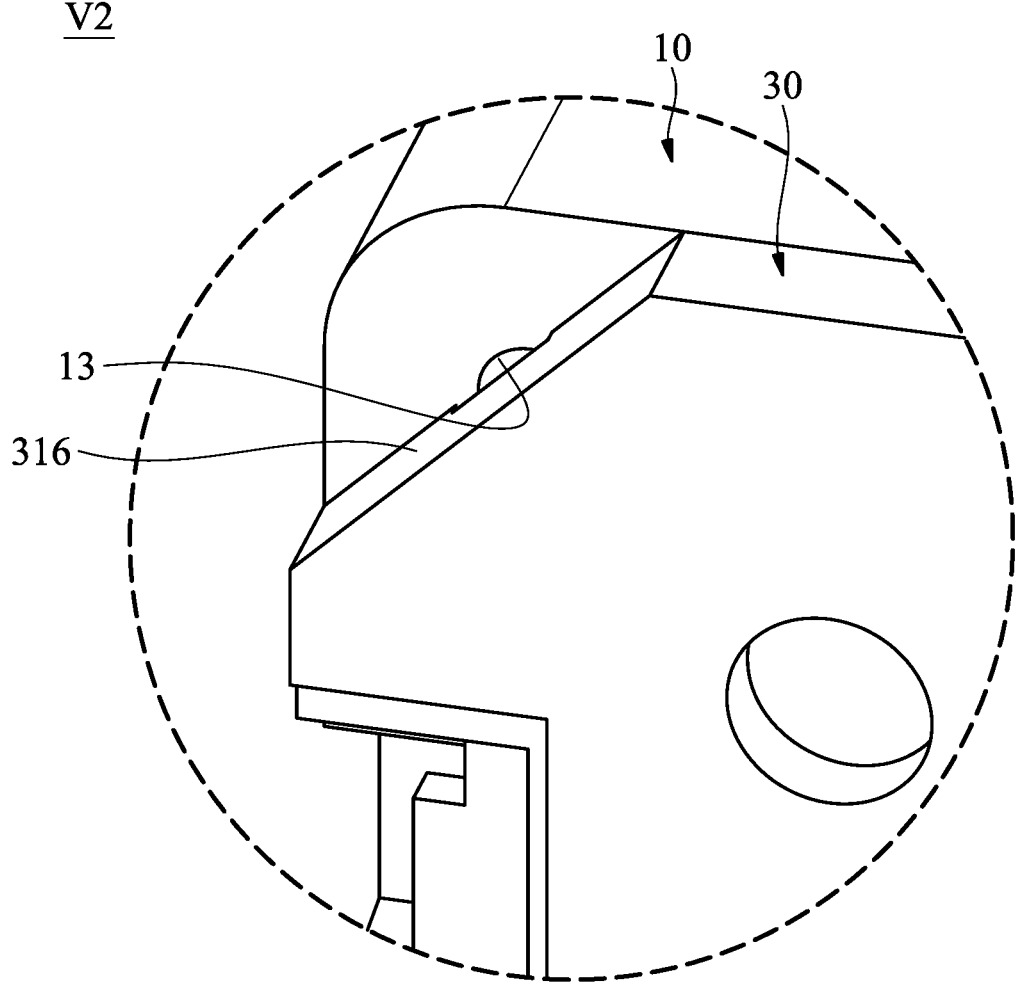
FIG. 21 shows an enlarged view of the portion V2 in FIG. 20.

FIG. 19 shows an exploded view of a housing 10 and a base 30 according to another embodiment of the invention, FIG. 20 shows a perspective diagram of the housing 10 and the base 30 in FIG. 19 after assembly, and FIG. 21 shows an enlarged view of the portion V2 in FIG. 20. Referring to FIG. 19, the housing 10 in this embodiment forms at least a first joining structure 13 located at a corner of the housing 10, and the plastic main body 31 of the base 30 forms at least a second joining structure 315 corresponding to the first joining structure 13.

As mentioned above, the housing 10 and the base 30 can form a case module of the driving mechanism, wherein the holder 20, the coil C, the upper and lower springs S1 and S2, and the magnets M shown in FIG. 1 can be accommodated in the case module. An optical element can be held by the holder 20, and the holder 20 and the optical element received therein can be driven to move relative to the housing 10 by the coil C and the magnets M, so as to achieve auto-focus and auto-zoom control of the optical element.

Referring to FIGS. 19-21, the first joining structure 13 is located on the inner side of the housing 10 and forms a curved fillet surface, and the second joining structure 315 forms a protrusion adjacent to an unfilled corner 316 of the main body 31. During assembly, the fillet surface of the first joining structure 13 can be used as a connection surface for connecting to the second joining structure 315.

As shown in FIGS. 20 and 21, after the housing 10 and the base 30 are assembled to each other, the fillet surface of the first joining structure 13 is exposed to a bottom side of the driving mechanism. As a result, the glue can be directly applied to a gap between the fillet surface and the second joining structure 315 from the bottom side of the driving mechanism, so as to increase the mechanical strength and convenience during assembly of the driving mechanism.

In summary, since the housing in the invention comprises plastic material, joining structures or metal supporting members can be applied on the housing for firmly connecting to the base, so that mechanical strength of the driving mechanism and convenience during assembly can be both increased.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:
1. A driving mechanism for driving an optical element, comprising:
 a housing, having plastic material, a recess and a first joining structure;
 a holder, movably disposed in the housing for holding the optical element;

a driving assembly, disposed in the housing for driving the holder and the optical element to move relative to the housing; and a base, having a second joining structure, an opening portion and a rib, wherein the first and second joining structures extend along an optical axis of the optical element, and the second joining structure forms a connection surface facing the optical axis and connected to the first joining structure;

wherein the opening portion is located adjacent to the recess, and the rib is extended from the opening portion along an inward direction of the opening portion, wherein the inward direction is not parallel to the optical axis.

2. The driving mechanism as claimed in claim 1, wherein the base further has a plastic main body and a metal member, and the second joining structure comprises a through hole formed on the metal member, wherein the first joining structure is extended through the through hole.

3. The driving mechanism as claimed in claim 2, wherein the second joining structure is exposed to a bottom side of the base.

4. The driving mechanism as claimed in claim 2, wherein the first joining structure protrudes from a lower surface of the metal member.

5. The driving mechanism as claimed in claim 4, wherein an end surface of the first joining structure has a height along the optical axis and between the metal member and a bottom surface of the main body.

6. The driving mechanism as claimed in claim 4, wherein the first joining structure forms a T-shaped end portion.

7. The driving mechanism as claimed in claim 1, wherein the housing further has two first joining structures, and the base further has a plastic main body, two metal members embedded in the main body, and two second joining structures, wherein the second joining structures are respectively formed on the metal members, corresponding to the first joining structures.

8. The driving mechanism as claimed in claim 1, wherein the housing further has a thickened portion with the first joining structure formed thereon.

9. The driving mechanism as claimed in claim 1, wherein the housing further has a stopper, and the holder comprises plastic material, wherein the stopper contacts the holder to restrict the holder and the optical element in a limit position.

10. The driving mechanism as claimed in claim 1, wherein the housing further has a channel formed on an inner surface of the housing and adjacent to the base.

11. The driving mechanism as claimed in claim 1, wherein the connection surface is a fillet surface formed at a corner of the housing, and at least a part of the fillet surface is exposed to a bottom side of the driving mechanism.

12. A driving mechanism for driving an optical element, comprising:

a housing, having plastic material, a recess and a first joining structure;

a holder, movably disposed in the housing for holding the optical element;

a driving assembly, disposed in the housing for driving the holder and the optical element to move relative to the housing; and a base, having a second joining structure, an opening portion and a rib portion, wherein the first and second joining structures extend along an optical axis of the optical element, and the second joining structure forms a connection surface facing the optical axis and connected to the first joining structure;

wherein the opening portion is located adjacent to the recess, and the rib portion is extended along an outward direction of the base, wherein the outward direction is not parallel to the optical axis.

13. The driving mechanism as claimed in claim 12, wherein the base further has a plastic main body and a metal member, and the second joining structure comprises a through hole formed on the metal member, wherein the first joining structure is extended through the through hole.

14. The driving mechanism as claimed in claim 13, wherein the second joining structure is exposed to a bottom side of the base.

15. The driving mechanism as claimed in claim 13, wherein the first joining structure protrudes from a lower surface of the metal member.

16. The driving mechanism as claimed in claim 15, wherein an end surface of the first joining structure has a height along the optical axis and between the metal member and a bottom surface of the main body.

17. The driving mechanism as claimed in claim 15, wherein the first joining structure forms a T-shaped end portion.

18. The driving mechanism as claimed in claim 12, wherein the housing further has two first joining structures, and the base further has a plastic main body, two metal members embedded in the main body, and two second joining structures, wherein the second joining structures are respectively formed on the metal members, corresponding to the first joining structures.

19. The driving mechanism as claimed in claim 12, wherein the housing further has a thickened portion with the first joining structure formed thereon.

20. The driving mechanism as claimed in claim 12, wherein the housing further has a stopper, and the holder comprises plastic material, wherein the stopper contacts the holder to restrict the holder and the optical element in a limit position.

21. The driving mechanism as claimed in claim 12, wherein the housing further has a channel formed on an inner surface of the housing and adjacent to the base.

\* \* \* \* \*